United States Patent
Huang et al.

(10) Patent No.: US 10,910,707 B2
(45) Date of Patent: Feb. 2, 2021

(54) TRANSMISSION DEVICE AND ANTENNA DOWN-TILT CONTROL SYSTEM

(71) Applicant: Comba Telecom Technology (Guangzhou) Limited, Guangdong (CN)

(72) Inventors: Chaosheng Huang, Guangdong (CN); Zefeng Ma, Guangdong (CN); Fengzhang Xue, Guangdong (CN); Jianjun You, Guangdong (CN); Hongbin Duan, Guangdong (CN); Peitao Liu, Guangdong (CN)

(73) Assignee: Comba Telecom Technology (Guangzhou) Limited

( * ) Notice: Subject to any disclaimer, the term of this patent is extended or adjusted under 35 U.S.C. 154(b) by 0 days.

(21) Appl. No.: 16/494,963

(22) PCT Filed: Dec. 28, 2017

(86) PCT No.: PCT/CN2017/119470
§ 371 (c)(1),
(2) Date: Sep. 17, 2019

(87) PCT Pub. No.: WO2018/166272
PCT Pub. Date: Sep. 20, 2018

(65) Prior Publication Data
US 2020/0287280 A1    Sep. 10, 2020

(30) Foreign Application Priority Data

Mar. 17, 2017 (CN) .......................... 2017 1 0160514

(51) Int. Cl.
*H01Q 3/02* (2006.01)
(52) U.S. Cl.
CPC .................................... *H01Q 3/02* (2013.01)

(58) Field of Classification Search
CPC ............... H01Q 3/02; H01Q 3/32; F16H 3/44
See application file for complete search history.

(56) References Cited

U.S. PATENT DOCUMENTS

| 6,738,024 | B2 | 5/2004 | Butler et al. |
| 8,027,703 | B2 | 9/2011 | Girard et al. |
| 2019/0027825 | A1* | 1/2019 | Fang ........................ F16H 1/28 |

FOREIGN PATENT DOCUMENTS

| CN | 104577336 A | 4/2015 |
| CN | 104852145 A | 8/2015 |

(Continued)

OTHER PUBLICATIONS

International Search Report for PCT/CN2017/119470 dated Mar. 21, 2018.

*Primary Examiner* — Ricardo I Magallanes
(74) *Attorney, Agent, or Firm* — Lerner, David, Littenberg, Krumholz & Mentlik, LLP

(57) ABSTRACT

A transmission device and an antenna down-tilt control system includes: an input component, comprising an inner gear ring, a first gear and a second gear both coaxial with the inner gear ring, and a third gear engaged with the first gear; a unidirectional control mechanism, comprising a first unidirectional component, the first unidirectional component comprising a first rotating member that can unidirectionally rotate in a first rotation direction, the first rotating member being fixedly connected to the inner gear ring; an output component, comprising at least two fourth gears arranged at an interval in a circumferential direction, the third gear being selectively engaged with any one of the fourth gears; and a rotary component, comprising a fifth gear and a rotary box.

13 Claims, 8 Drawing Sheets

(56) References Cited

FOREIGN PATENT DOCUMENTS

| CN | 105508518 A | 4/2016 | |
|---|---|---|---|
| CN | 105514610 A | 4/2016 | |
| CN | 106838149 A | 6/2017 | |
| CN | 206754298 U | 12/2017 | |
| WO | WO-2007107051 A1 * | 9/2007 | ............... H01Q 3/32 |

* cited by examiner

TRANSMISSION DEVICE AND ANTENNA DOWN-TILT CONTROL SYSTEM

CROSS-REFERENCE TO RELATED APPLICATIONS

The present application is a national phase entry under 35 U.S.C § 371 of International Application No. PCT/CN2017/119470 filed Dec. 28, 2017, which claims priority from Chinese Application No. 201710160514.7 filed Mar. 17, 2017, all of which are hereby incorporated herein by reference.

FIELD OF THE INVENTION

The present invention relates to the technical field of mobile communication devices, and in particular to a transmission device and antenna down-tilt control system.

BACKGROUND OF THE INVENTION

Due to the increasing number of mobile communication terminal users, higher network capacity of stations in mobile cellular networks is required. Meanwhile, it is necessary to ensure the minimal interference between different stations or even between different sectors of a same station, that is, to maximize the network capacity and minimize the interference. Usually, this is realized by adjusting the antenna beam down-tilt in the stations.

At present, two methods are used to adjust the beam down-tilt: mechanical down-tilt and electrical down-tilt. Electrical down-tilt is obviously advantageous and becomes the current mainstream and the future trend. The conventional electrical down-tilt transmission devices are complex in structure. When there are lots of beams, the interior space of the antenna is increased, the overall size of the transmission device becomes large, and the cost is greatly increased. Meanwhile, it is unable to realize more precise control.

SUMMARY OF THE INVENTION

In view of this, it is necessary to provide a transmission device and an antenna down-tilt control system, which can realize independent and precise control over the down-tilt of two or more beam antennas, and is compact in structure, small in overall size, and low in production cost.

The following technical solution is proposed in the present invention.

A transmission device is provided, including: an input component, comprising an inner gear ring, a first gear and a second gear both coaxial with the inner gear ring, and a third gear in functional connection to the first gear, the first gear and the second gear being separately mounted on an input shaft and the first gear having a transmission ratio different from that of the second gear, the first gear driving the third gear to rotate, the third gear having a first end engaged with the inner gear ring and being capable of rotating or revolving, and the third gear having a second end arranged outside the inner gear ring; a unidirectional control mechanism fixed at a preset position, the unidirectional control mechanism comprising a first unidirectional component arranged near the inner gear ring, the first unidirectional component comprising a first rotating member that can unidirectionally rotate in a first rotation direction, the first rotating member being fixedly connected to the inner gear ring; an output component, comprising at least two fourth gears arranged at an interval in a circumferential direction, the second end of the third gear being arranged on an inner side of the fourth gear and the third gear being selectively engaged with any one of the fourth gears; and a rotary component, comprising a fifth gear that rotates in a direction opposite to the rotation direction of the third gear and a rotary box for housing the first gear, the second gear and the third gear, the fifth gear being arranged on the rotary box in a rotatable manner, the fifth gear having a first end in functional connection to the second gear and being driven by the second gear to rotate, the fifth gear having a second end arranged on an outer side of the fourth gear and being selectively engaged with the fourth gear, and the third gear being mounted in the rotary box and capable of driving the rotary box to rotate.

When the transmission device is in use, the input shaft is connected to an output end of a servo motor, the first gear and the second gear are driven by the input shaft to rotate in a same direction, the first gear drives the third gear to rotate, and the second gear drives the fifth gear to rotate; when the first gear drives the third gear to rotate in a direction opposite to the first rotation direction, the inner gear ring is unable to rotate in the direction opposite to the first rotation direction since the inner gear ring is fixedly connected to the first rotating member (the first rotating member is unable to rotate in the direction opposite to the first rotation direction), therefore the third gear revolves towards the first rotation direction and also drives the rotary box to rotate along the first rotation direction (the rotary box is a planetary carrier that rotates in the first rotation direction), thus, according to the position of an antenna whose down-tilt is to be adjusted, the third gear or the fifth gear revolves to this position and comes into engagement with a corresponding fourth gear; then, the rotation direction of the input shaft is reversed, when the first gear drives the third gear to rotate in the first rotation direction, the inner gear ring can rotate in the first rotation direction (the first rotating member can rotate in the first rotation direction) and the third gear rotates about itself in the first rotation direction, if the third gear is engaged with the fourth gear, the reverse rotation of the fourth gear in the first rotation direction can be thus realized, and if the fifth gear is engaged with the fourth gear, the rotation of the fourth gear in the first rotation direction can be thus realized, and accordingly, the adjustment to the antenna down-tilt is realized; and after the adjustment to the antenna down-tilt is completed, the supply of power is stopped to stop the rotation of the third gear timely by the unidirectional control mechanism. In a next adjustment, the third gear is enabled to revolve and then rotate about itself (without revolving) after reaching the adjustment position, to realize the adjustment to a corresponding antenna down-tilt. Since the first gear has a transmission ratio different from that of the second gear, it is convenient to ensure more precise adjustment to the revolution position of the third gear during the beam antenna adjustment, so that the engagement error between the third gear and the fourth gear, or, between the fifth gear and the fourth gear, will not be greater than half of a gear tooth. The transmission device can realize independent and precise control over the down-tilt of two or more beam antennas, and is compact in structure, small in size, and low in production cost.

The technical solution will be further described below.

In an embodiment, the first gear is engaged with the third gear; and the rotary component further comprises a sixth gear mounted in the rotary box, by which the fifth gear is driven by the second gear to rotate in a same direction. Therefore, the first gear drives the third gear to rotate in an opposite direction, the second gear drives the fifth gear by the sixth gear to rotate in a same direction, and when the first gear rotates in a clockwise direction, the third gear rotates in a counterclockwise direction and the fifth gear rotates in the clockwise direction. The synchronous rotation of the fifth gear and the second gear can be driven by the sixth gear, or the rotation of the fifth gear and the second gear in a same direction can be realized by engagement with other transmission gear sets.

In an embodiment, the input component further comprises a seventh gear mounted in the rotary box and engaged with both the first gear and the third gear, by which the third gear is driven by the first gear to rotate in a same direction; and the rotary component further comprises a transmission gear set mounted in the rotary box, by which the fifth gear is driven by the second gear to rotate in an opposite direction. Therefore, the rotation of the first gear and the third gear in a same direction is realized by the sixth gear, and the rotation of the second gear and the fifth gear in an opposite direction is realized by the transmission gear set. The synchronous rotation of the fifth gear and the second gear in an opposite direction can be realized by the transmission gear set. The transmission gear set enables the fifth gear and the second gear to rotate in an opposite direction by the engaged transmission of two gears or the engaged transmission of four gears.

In an embodiment, the unidirectional control mechanism further comprises a second unidirectional component arranged in opposite to the first unidirectional component, the second unidirectional component comprising a second rotating member that can unidirectionally rotate in the first rotation direction, the second rotating member being fixedly connected to the rotary box. Therefore, when the first gear drives the third gear to rotate in a direction opposite to the first rotation direction, the inner gear ring is unable to rotate in the direction opposite to the first rotation direction since the inner gear ring is fixedly connected to the first rotating member (the first rotating member is unable to rotate in the direction opposite to the first rotation direction), and because the second rotating member can rotate only in the first rotation direction, the third gear can revolve only towards the first rotation direction and also drives the rotary box to rotate along the first rotation direction, thus, according to the position of an antenna whose down-tilt is to be adjusted, the third gear or the fifth gear revolves to this position and comes into engagement with a corresponding fourth gear; then, the rotation direction of the input shaft is reversed, when the first gear drives the third gear to rotate in the first rotation direction, the inner gear ring can rotate in the first rotation direction (the first rotating member can rotate in the first rotation direction), but because the second rotating member is unable to revolve in the direction opposite to the first rotation direction, the third gear can rotate about itself only in the first rotation direction to avoid slippage, and accordingly, the adjustment to the antenna down-tilt is realized; and after the adjustment to the antenna down-tilt is completed, the supply of power is stopped to stop the rotation of the third gear timely by the second unidirectional component. Therefore, by the second rotating member of the second unidirectional component, it is able to ensure that the third gear will not rotate about itself while revolving.

In an embodiment, the first unidirectional component further comprises a third rotating member that is inserted into the first rotating member and can unidirectionally rotate relative to the first rotating member, the third rotating member being fixed in a first preset position; and the second unidirectional component further comprises a fourth rotating member that is inserted into the second rotating member and can unidirectionally rotate relative to the second rotating member, the fourth rotating member being fixed in a second preset position. The specific examples of the first unidirectional component and the second unidirectional component are, for example, unidirectional rotating mechanisms such as unidirectional clutches and unidirectional bearings.

In an embodiment, the first unidirectional component is a first unidirectional bearing, the first rotating member is an inner ring of the first unidirectional bearing and the third rotating member is an outer ring of the first unidirectional bearing, or the first rotating member is an outer ring of the first unidirectional bearing and the third rotating member is an inner ring of the first unidirectional bearing; and the second unidirectional component is a second unidirectional bearing, the second rotating member is an inner ring of the second unidirectional bearing and the fourth rotating member is an outer ring of the second unidirectional bearing, or the second unidirectional component is a second unidirectional bearing, the second rotating member is an outer ring of the second unidirectional bearing and the fourth rotating member is an inner ring of the second unidirectional bearing. Therefore, the revolution or rotation of the third gear can be realized by a unidirectional bearing, and the unidirectional bearing has advantages of rapid response and higher adjustment precision. Whether the third gear and the inner gear ring are connected to the inner ring of the unidirectional bearing or to the outer ring of the unidirectional bearing may be determined according to actual requirements. When the outer ring is fixed, the inner ring is fixedly connected to the first rotating member; and when the inner ring is fixed, the outer ring is fixedly connected to the first rotating member. The specific implementation of the first unidirectional bearing or second unidirectional bearing in the preset position can be realized by the existing technologies and will not be repeated here.

In an embodiment, the inner gear ring is provided with a first connector, and the first rotating member is provided with a first engaging hole in snap fit with the connector. Therefore, by the snap fit of the first connector with the first engaging hole, the inner gear ring is fixedly connected to the first rotating member. Meanwhile, it is also convenient for assembly and disassembly.

In an embodiment, on an outer side of the first connector, there are at least two first lugs arranged at an interval in a circumferential direction, and first engaging grooves, into which the first lugs are clamped, are formed on an inner wall of the first engaging hole. Therefore, by the one-to-one fitting of at least two first lugs with at least two first engaging grooves, the slippage, which may influence the transmission precision, between the inner gear ring and the first rotating member can be effectively avoided.

In an embodiment, the first connector is provided with a first fitting hole in rotation fit with the first end of the input shaft. Therefore, it is convenient to mount the input shaft by the first fitting hole.

In an embodiment, the rotary box comprises a first box body and a second box body that forms a placement chamber together with the first box body, the first box body is fixedly connected to the second rotating member, the second box body comprises a first cavity for accommodating the second gear and the third gear and a second cavity for accommodating the fifth gear, and the first cavity has a first gap and the second cavity has a second gap; and the second end of the third gear is engaged with the inner side of the fourth gear through the first gap, and the fifth gear is engaged with the outer side of the fourth gear through the second gap. Therefore, the arrangement of the first box body and the second box body is convenient both for the mounting of the first gear, the second gear, the third gear, the fifth gear and the sixth gear, and the later maintenance. Meanwhile, by the arrangement of the first gap and the second gap, the gears in the rotary box can be better protected, and the lubrication is facilitated.

In an embodiment, the first box body is further provided with a second connector, and the second rotating member is provided with a second bayonet in snap fit with the connector. Therefore, by the snap fit of the second connector with the second bayonet, the first box body is fixedly connected to the second rotating member. Meanwhile, it is also convenient for assembly and disassembly.

In an embodiment, on an outer side of the second connector, there are at least two second lugs arranged at an interval in a circumferential direction, and second engaging grooves, into which the second lugs are clamped, are formed on an inner wall of the second bayonet. Therefore, by the one-to-one fitting of at least two second lugs with at least two second engaging grooves, the slippage, which may influence the transmission precision, between the first box body and the second rotating member can be effectively avoided.

In an embodiment, the second connector is further provided with a second fitting hole in rotation fit with the second end of the input shaft. Therefore, it is convenient to mount the input shaft by the second fitting hole.

In an embodiment, the first box body is provided with an annular member protruding outwardly, on which multiple sensing portions are formed.

In an embodiment, the sensing portions comprise at least two first sensing gaps arranged at an equal interval in the circumferential direction and second sensing gaps arranged between adjacent two of the first sensing gaps. Therefore, the position of the third gear can be determined by the first sensing gaps and the position of the third gear can be corrected by the second sensing gaps.

In an embodiment, the transmission device further comprises a first mounting plate on which the second preset position is formed, wherein sensing elements configured to sense the first sensing gaps and/or the second sensing gaps are arranged on the first mounting plate; and the fourth rotating member is fixed in the second preset position on the first mounting plate. Therefore, by the arrangement of the sensing elements on the first mounting plate, when the rotary box is turned, the position of the first sensing gaps and the second sensing gaps changes correspondingly. The sensing elements can sense the change in position and send a corresponding trigger signal to the control device. Thus, the initial position of the rotary box can be corrected, or the initial position of the third gear or the initial position of the fifth gear can be located.

In an embodiment, an annular groove fitted with the annular member is formed on the first mounting plate.

In an embodiment, the output component further comprises a holder, on which a mounting through hole and at least two locking holes arranged at an interval in a peripheral direction of the mounting through hole are formed; the fourth gear is arranged on the holder in such a manner that it can return elastically, a mounting shaft in sliding fit with the mounting through hole and at least two locking lugs respectively corresponding to the locking holes are disposed at one end of the fourth gear, and a first fitting lug arranged near the first gap and a second fitting lug arranged near the second gap are further disposed on the second box body; the fourth gear can rotate, when a tail end of the mounting shaft is pressed against the first fitting lug or the second fitting lug; and the locking lug is locked in the locking hole, when the tail end of the mounting shaft is displaced from the first fitting lug or the second fitting lug. Therefore, when the third gear revolves and the fourth gear is displaced from the first fitting lug or the second fitting lug, the fourth gear is locked so the fourth gear will not be driven to rotate even when the third gear or the fifth gear touches the fourth gear, and the fourth gear stays in a preset position without interfering the rotation of the third gear or the fifth gear. As the rotary box rotates together with the third gear, the shaft of the fourth gear can rotate, only when the first fitting lug or the second fitting lug on the rotary box is pressed against the tail end of the mounting shaft of the fourth gear and the fourth gear moves upward so that the locking lugs are separated from the locking holes. By such an arrangement, external interference is avoided. The adjustment to the beam antenna down-tilt is more precise.

In an embodiment, the transmission device further comprises a second mounting plate on which the first preset position is formed, wherein the second mounting plate is fixedly connected to the holder by a connecting rod, at least two output shafts arranged at an interval in a same circumference are disposed on the second mounting plate, the output shafts are in transmission connection to the fourth gears in a one-to-one correspondence and the fourth gears can slide in an axial direction of the output shafts, and an elastic member configured to press the fourth gear is disposed on the output shaft; and the third rotating member is fixed in the first preset position on the second mounting plate. By the second mounting plate, the output component is mounted and fixed, the fourth gear is arranged on the holder in such a manner that it can return elastically, and the fourth gear drives the output shaft to output power for rotation, in order to realize the adjustment to the beam antenna down-tilt.

In an embodiment, the mounting shaft has a conical pressing end and the locking lug has a conical free end. Therefore, it is convenient for the fourth gear to be locked, so that the fourth gear will not rotate when the third gear revolves.

The technical solution further provides an antenna down-tilt control system, comprising the transmission device described above, further comprising a driving device having a rotary output end connected to the input shaft, and a controller electrically coupled to the driving device.

The antenna down-tilt control system uses, according to the requirement of adjustment to the antenna down-tilt, the controller to control the forward and reverse rotation of the output end of the driving device, so that the first gear can rotate forwardly or reversely in the first rotation direction. In this way, the remote and intelligent adjustment to the down-tilt of the multi-beam antenna is realized.

REFERENCE NUMERALS

100: input component; 110: inner gear ring; 120: first gear; 130: second gear; 140: third gear; 142: first end of the third gear; 144: second end of the third gear; 150: seventh gear; 210: first unidirectional component; 212: first rotating member; 214: third rotating member; 220: second unidirectional component; 222: second rotating member; 224: fourth rotating member; 300: output component; 310: fourth gear; 312: mounting shaft; 302: conical pressing end; 314: locking lug; 320: holder; 322: mounting through hole; 324: locking hole; 400: rotary component; 410: rotary box; 412: first box body; 401: annular member; 402: first sensing gap; 403: second sensing gap; 414: second box body; 416: first cavity; 407: first gap; 418: second cavity; 408: second gap; 4141: first fitting lug; 4142: second fitting lug; 420: fifth gear; 422: first end of the fifth gear; 424: second end of the fifth gear; 430: sixth gear; 440: transmission gear set; 500: first mounting plate; 510: annular groove; 600: second mounting plate; 610: output shaft; 620: elastic member; 10: input shaft; and 20: connecting rod.

DETAILED DESCRIPTION OF THE INVENTION

In order to make the objectives, technical solutions and advantages of the present invention clearer, the present invention will be further described below in detail with reference to the accompanying drawings by specific implementations. It should be understood that the specific implementations to be described herein are merely intended to explain the present invention, rather than limiting the protection scope of the present invention.

It is to be noted that when an element is referred to as being "fixed to", "mounted on" or "arranged on" another element, it may be fixed to, mounted on or arranged on the other element directly or with intervening elements therebetween. When an element is referred to as being "connected to" another element, it may be connected to the other element directly or with intervening elements therebetween. As used herein, terms such as "vertical", "horizontal", "left" and "right" are for illustrative purposes only, not representing the only implementations.

Unless otherwise defined, all technical and scientific terms used herein have the same meaning as commonly understood by one of ordinary skill in the art to which the present invention belongs. Here, terms used in the description of the present invention are merely intended to describe specific implementations, rather than limiting the present invention. As used herein, term "and/or" includes all or any of one or more associated listed items or combinations thereof.

As used here, "first", "second", "third", "fourth", "fifth", "sixth" and "seventh" are merely used for distinguishing elements in terms of name, without representing any specific number and order.

Figure 1:
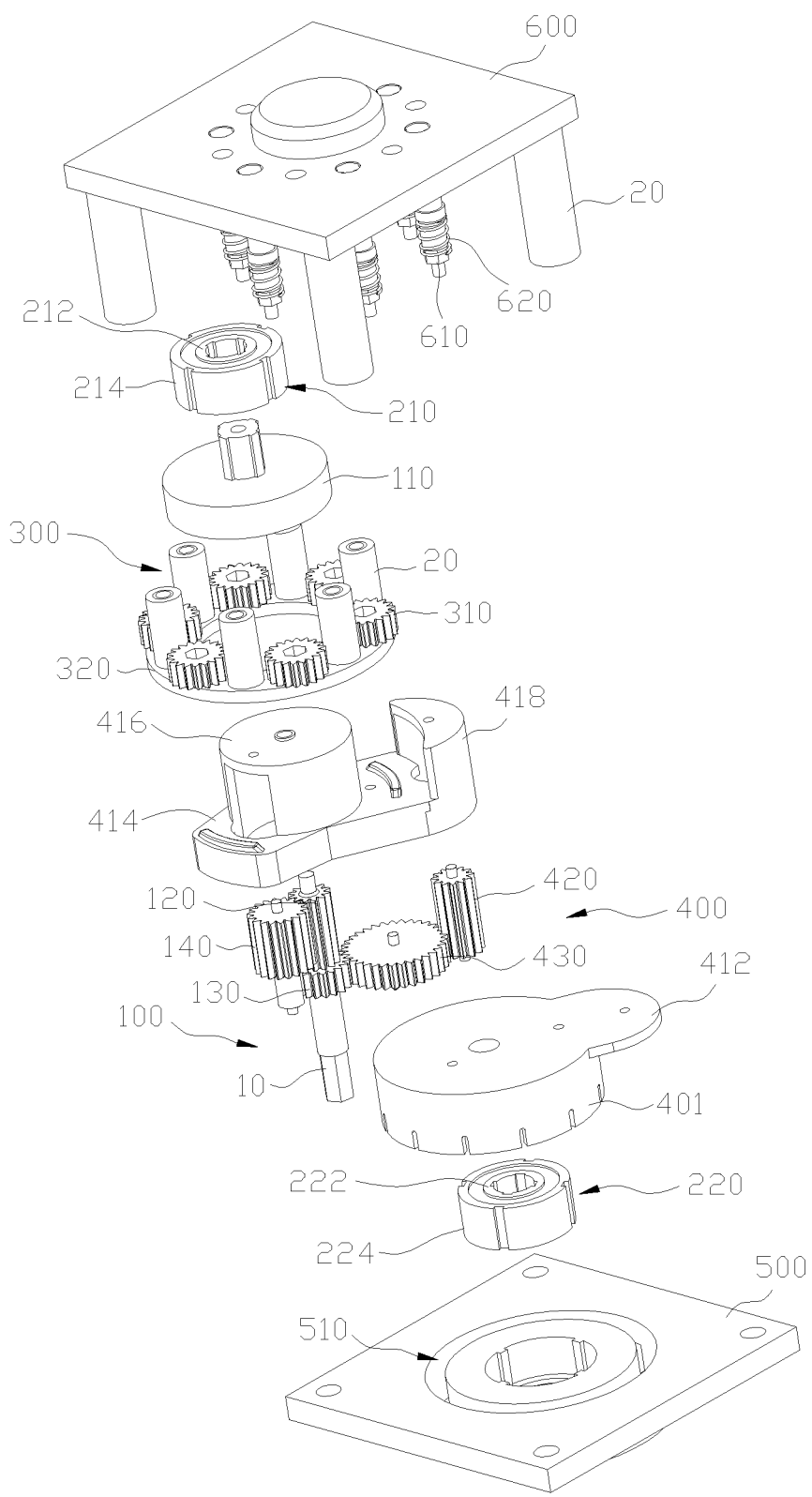
FIG. 1 is an exploded view of the transmission device according to the present invention.
Figure 2:
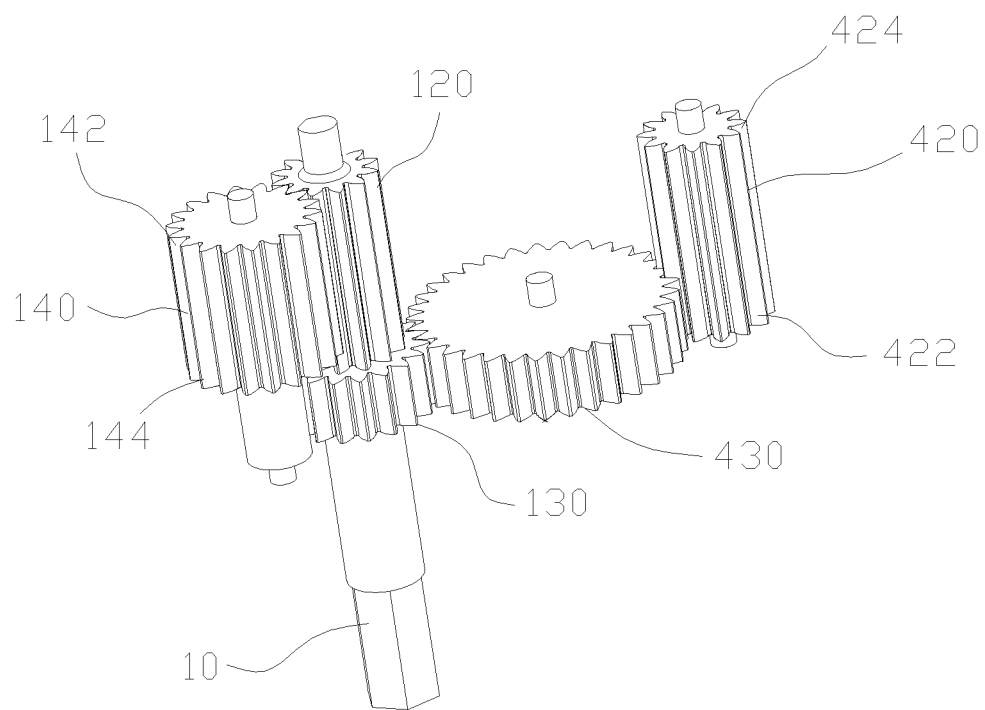
FIG. 2 is a view of the transmission fit relation between gears of the transmission device according to Embodiment 1 of the present invention.
Figure 3:
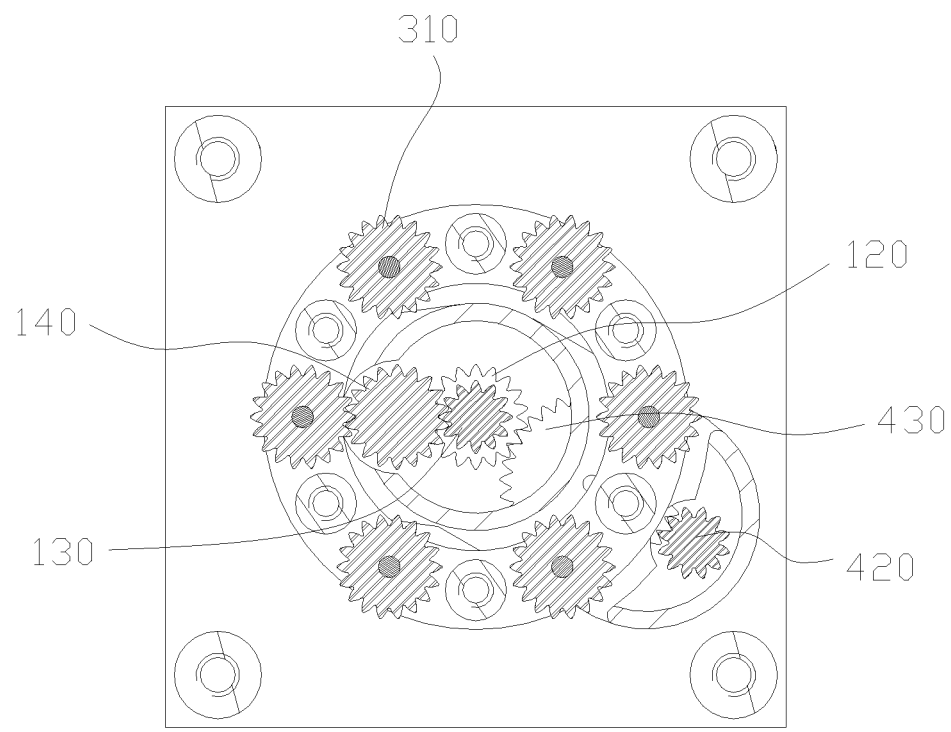
FIG. 3 is a top view of the transmission fit relation between gears of the transmission device according to Embodiment 1 of the present invention.
Figure 4:
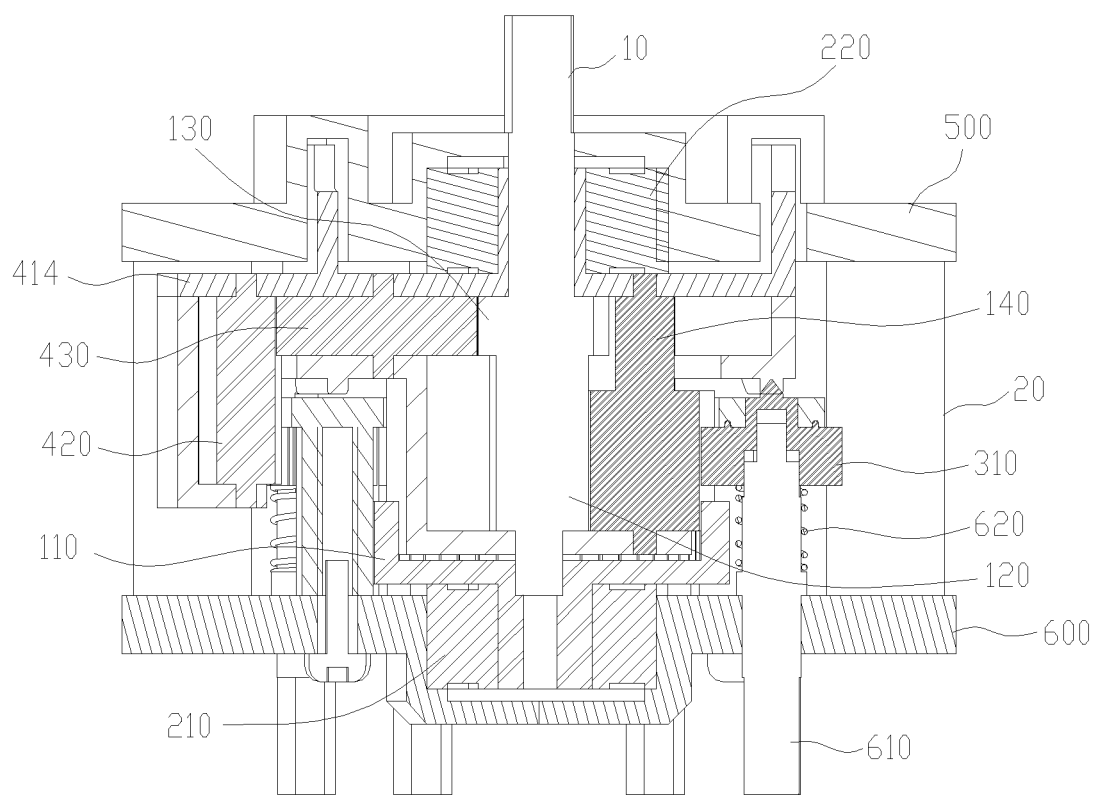
FIG. 4 is a half-sectional view of the transmission device according to Embodiment 1 of the present invention.
Figure 5:
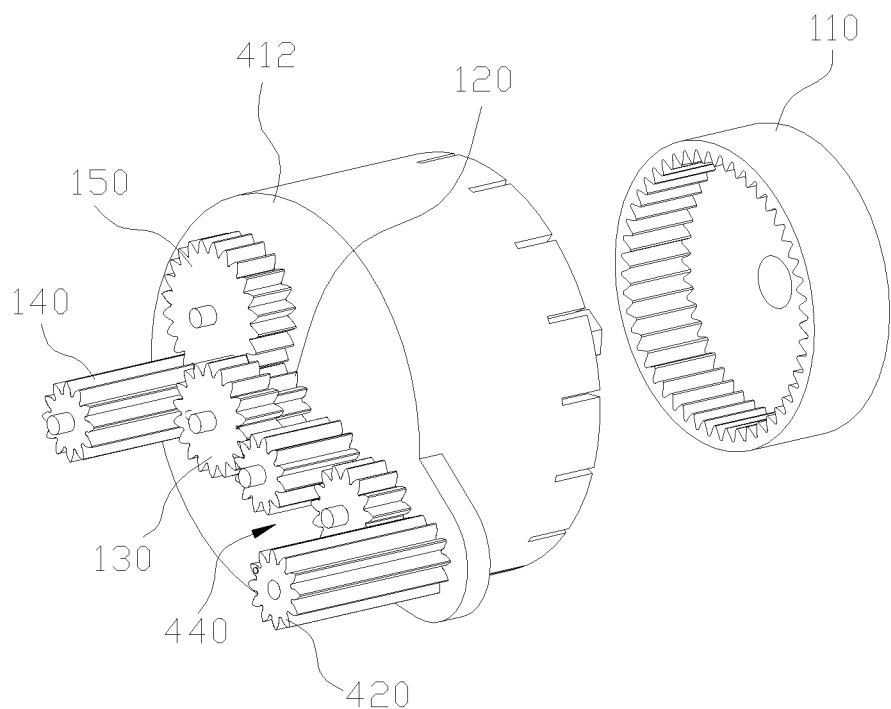
FIG. 5 is a schematic view of the transmission fit relation between gears of the transmission device according to Embodiment 2 of the present invention.
Figure 6:
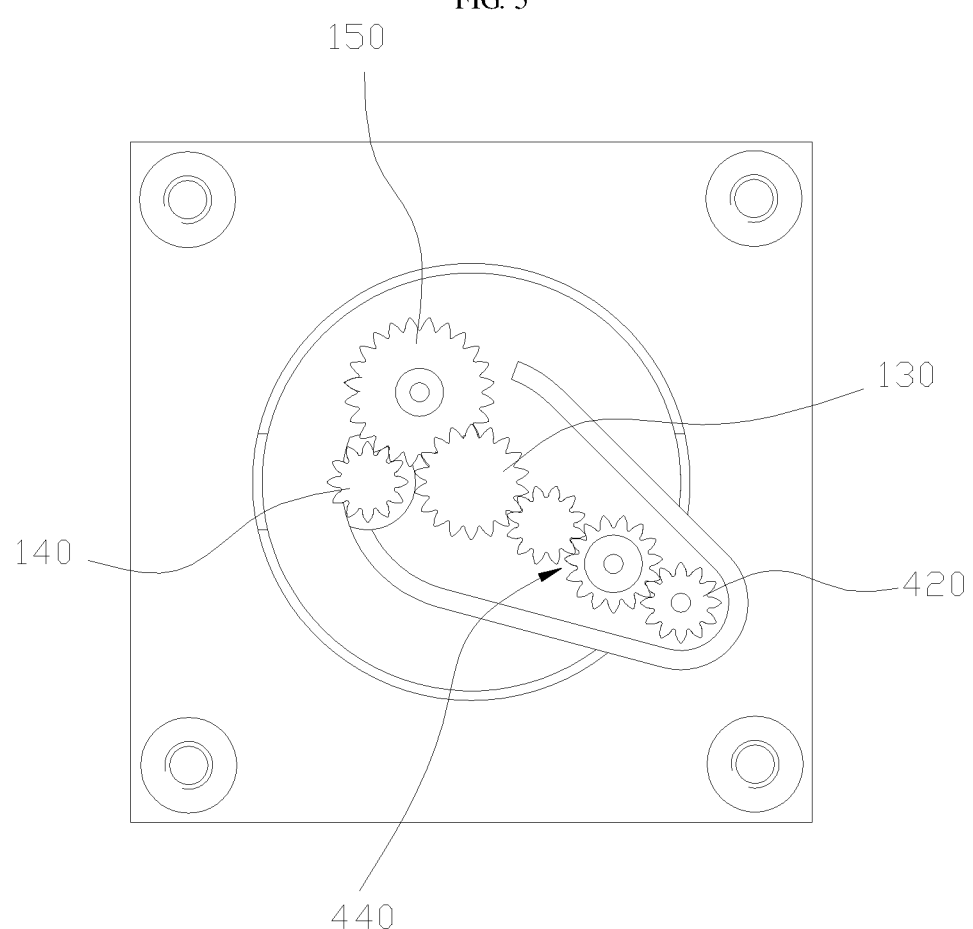
FIG. 6 is a top view of the transmission fit relation between gears of the transmission device according to Embodiment 2 of the present invention.
Figure 7:
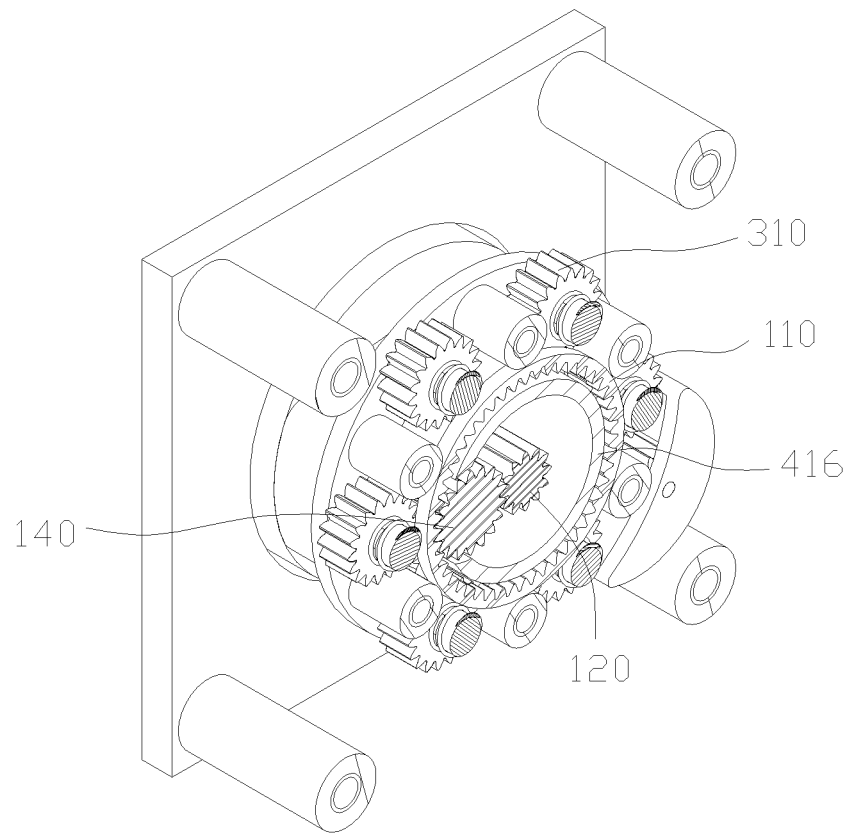
FIG. 7 is a three-dimensional sectional view of the transmission device according to the present invention.
Figure 8:
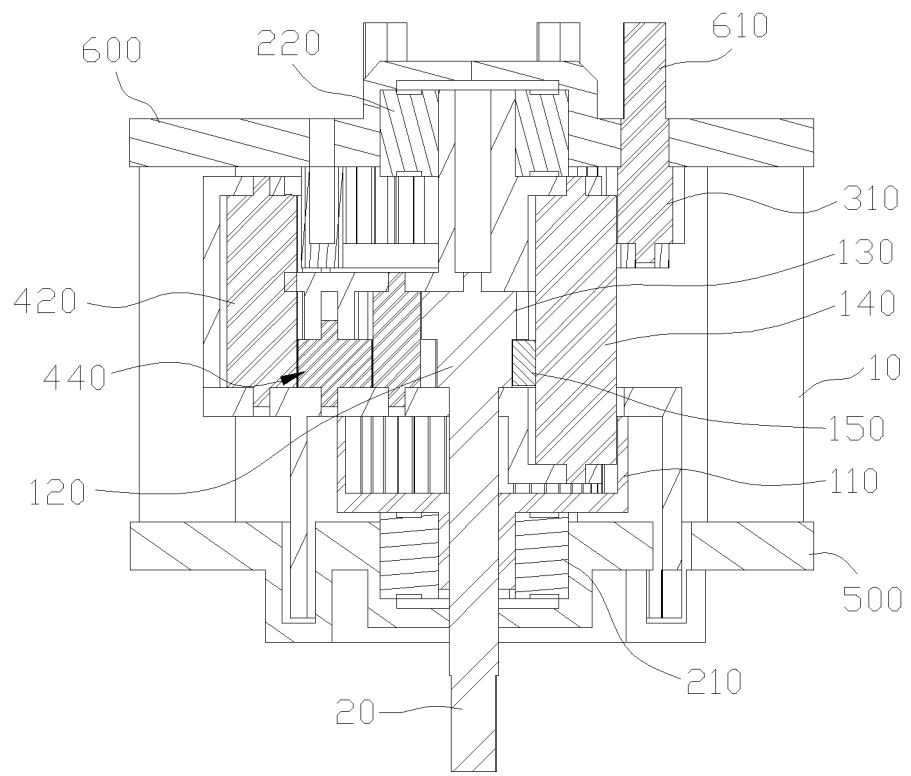
FIG. 8 is a half-sectional view of the transmission device according to Embodiment 2 of the present invention.
Figure 9:
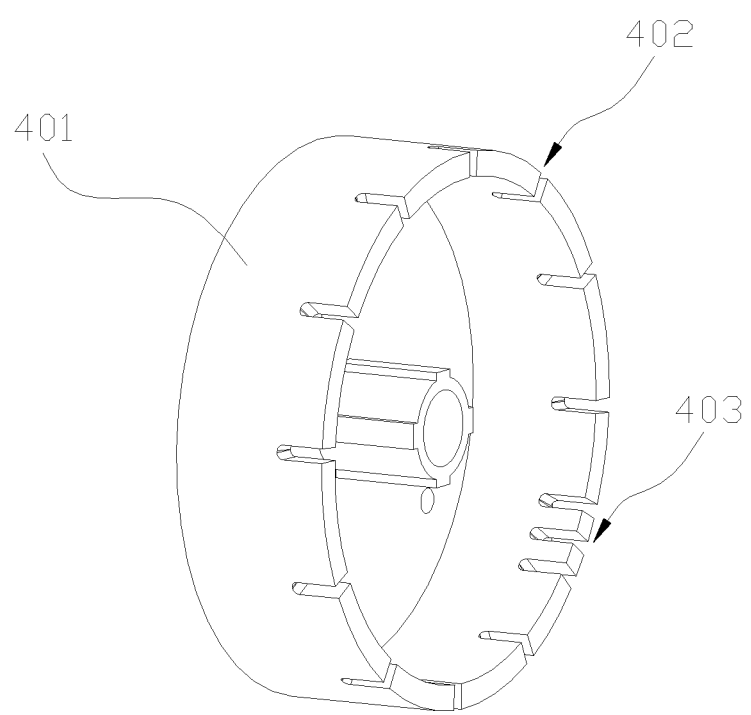
FIG. 9 is a partially enlarged view of the first box body according to the present invention.
Figure 10:
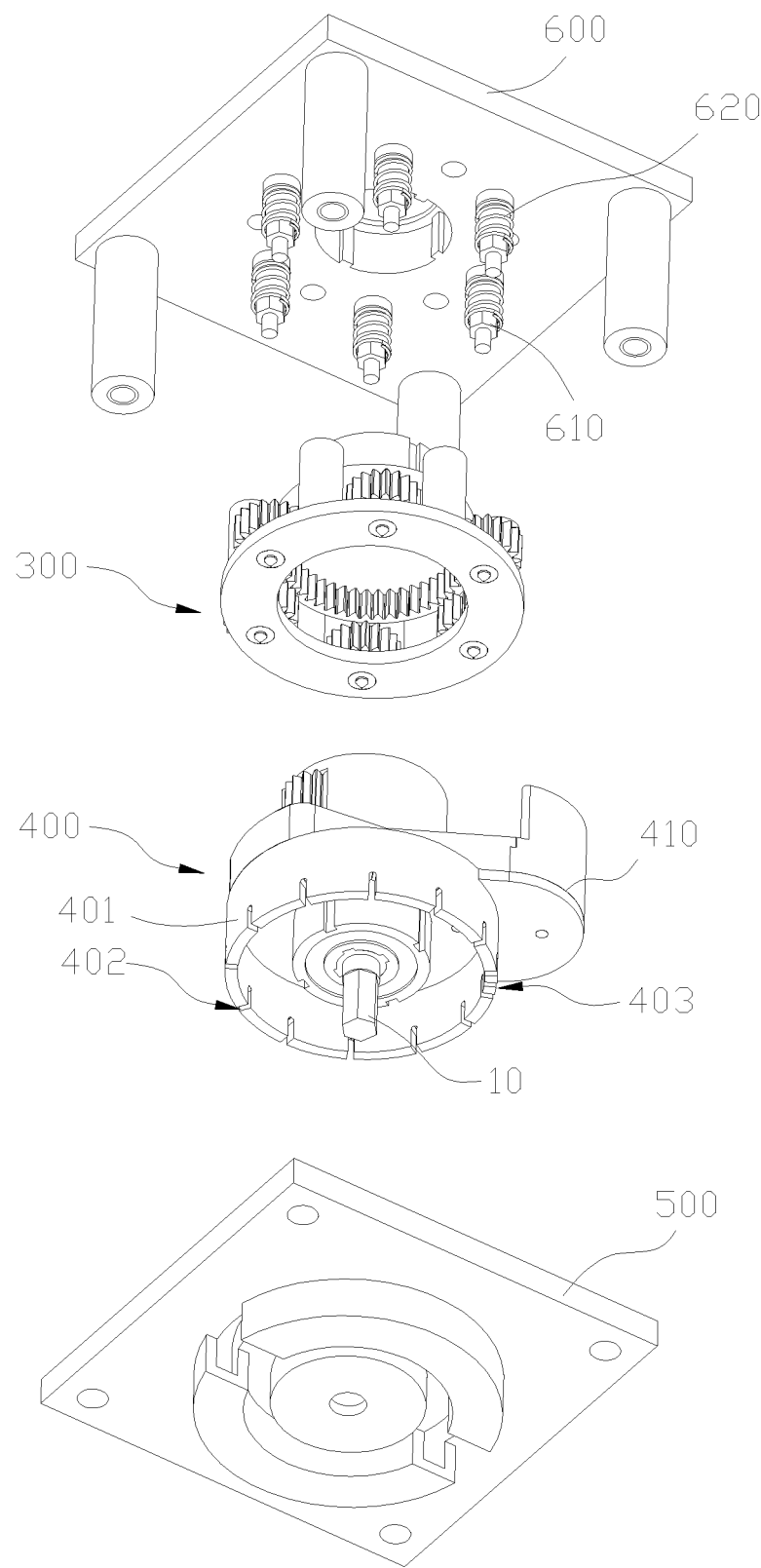
FIG. 10 is an exploded view of the fit relation between components of the transmission device according to the present invention.
Figure 11:
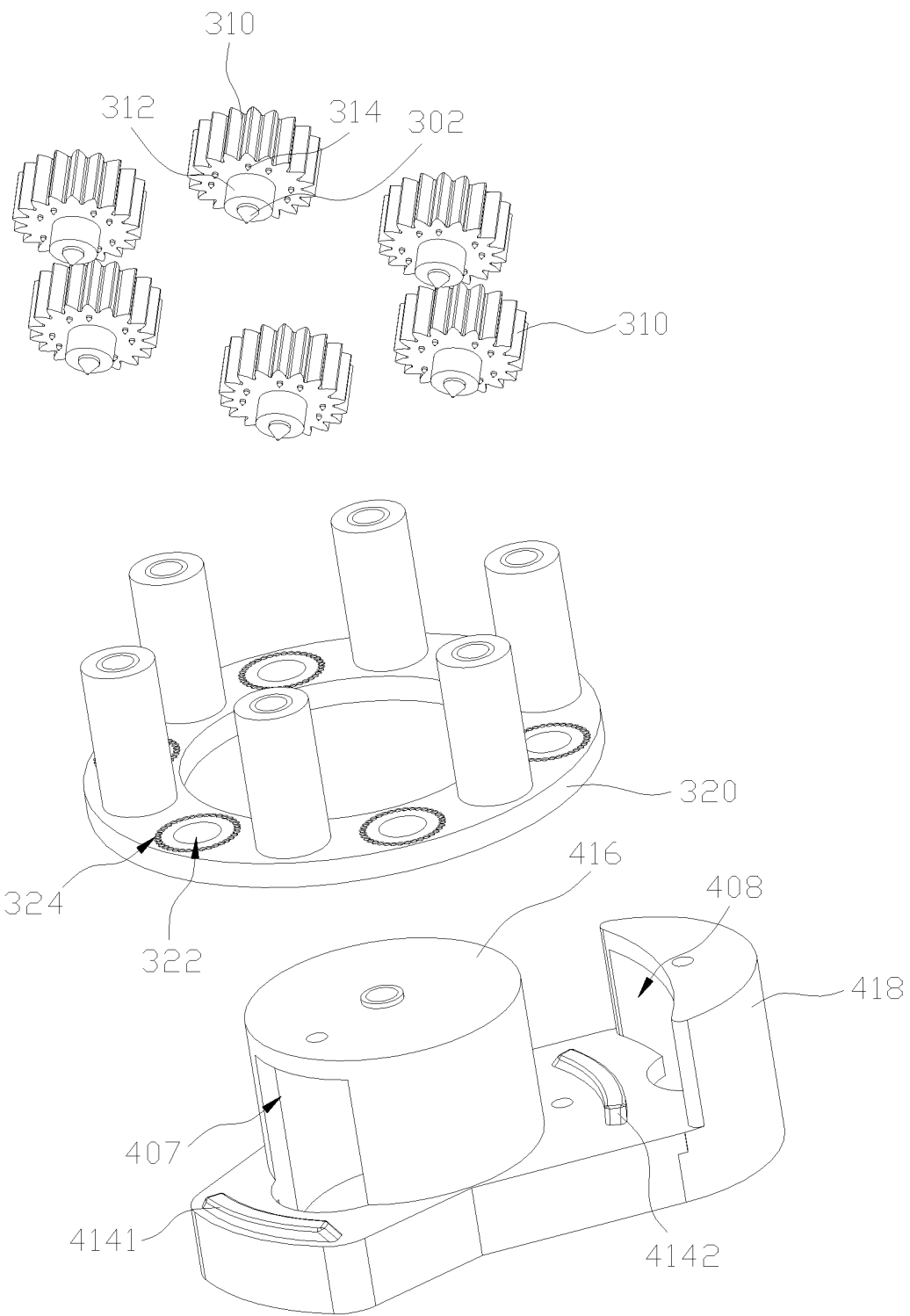
FIG. 11 is a partially enlarged exploded view of the transmission device according to the present invention.

As shown in FIG. 1, the transmission device of the present invention comprises: an input component 100, comprising an inner gear ring 110, a first gear 120 and a second gear 130 both coaxial with the inner gear ring 110, and a third gear 140 in functional connection to the first gear 120, the first gear 120 and the second gear 130 being separately mounted on an input shaft 10 and the first gear 120 having a transmission ratio different from that of the second gear 130, the first gear 120 driving the third gear 140 to rotate, the third gear having a first end 142 engaged with the inner gear ring 110 and being capable of rotating or revolving, and the third gear having a second end 144 arranged outside the inner gear ring 110; a unidirectional control mechanism fixed at a preset position, the unidirectional control mechanism comprising a first unidirectional component 210 arranged near the inner gear ring 110, the first unidirectional component 210 comprising a first rotating member 212 that can unidirectionally rotate in a first rotation direction, the first rotating member 212 being fixedly connected to the inner gear ring 110; an output component 300, comprising at least two fourth gears 310 arranged at an interval in a circumferential direction, the second end 144 of the third gear being arranged on an inner side of the fourth gear 310 and the third gear being selectively engaged with any one of the fourth gears 310; and a rotary component 400, comprising a fifth gear 420 that rotates in a direction opposite to the rotation direction of the third gear 140 and a rotary box 410 for housing the first gear 120, the second gear 130 and the third gear 140 therein, the fifth gear 420 being arranged on the rotary box 410 in a rotatable manner, the fifth gear having a first end 422 in functional connection to the second gear 130 and rotating in a same direction as the second gear 130, the fifth gear having a second end 424 arranged on an outer side of the fourth gear 310 and being selectively engaged with the fourth gear 310, and the third gear 140 being mounted in the rotary box 410 and capable of driving the rotary box 410 to rotate.

As shown in FIG. 1 to FIG. 5, when the transmission device is in use, the input shaft 10 is connected to an output end of a servo motor, the first gear 120 and the second gear 130 are driven by the input shaft 10 to rotate, the first gear 120 drives the third gear 140 to rotate, and the second gear 130 drives the fifth gear 420 to rotate; when the first gear 120 drives the third gear 140 to rotate in a direction opposite to the first rotation direction, the inner gear ring 110 is unable to rotate in a direction opposite to the first rotation direction since the inner gear ring 110 is fixedly connected to the first rotating member 212 (the first rotating member 212 is unable to rotate in the direction opposite to the first rotation direction), therefore the third gear 140 revolves towards the first rotation direction and also drives the rotary box 410 to rotate along the first rotation direction (the rotary box 410 is a planetary carrier that rotates in the first rotation direction), thus, according to the position of an antenna whose down-tilt is to be adjusted, the third gear 140 or the fifth gear 420 revolves to this position and comes into engagement with a corresponding fourth gear 310; then, the rotation direction of the input shaft 10 is reversed, when the first gear 120 drives the third gear 140 to rotate in the first rotation direction, the inner gear ring 110 can rotate in the first rotation direction (the first rotating member 212 can rotate in the first rotation direction) and the third gear 140 rotates about itself in the first rotation direction (the third gear 140 is engaged with the fourth gear 310 or the fifth gear 420 is engaged with the fourth gear 310, the rotary box 410 does not rotate, that is, the planetary carrier is fixed), if the third gear 140 is engaged with the fourth gear 310, the rotation of the fourth gear 310 in the direction opposite to the first rotation direction can be thus realized, and if the fifth gear 420 is engaged with the fourth gear 310, the rotation of the fourth gear 310 in the first rotation direction can be thus realized, and accordingly, the adjustment to the antenna down-tilt is realized; and after the adjustment to the antenna down-tilt is completed, the supply of power is stopped to stop the rotation of the third gear 140 timely by the unidirectional control mechanism. In a next adjustment, the third gear 140 is enabled to revolve and then rotate about itself (without revolving) after reaching the adjustment position, to realize the adjustment to a corresponding antenna down-tilt. Since the first gear 120 has a transmission ratio different from that of the second gear 130, the adjustment to the beam antenna is more precise. Meanwhile, the engagement error between the third gear 140 and the fourth gear 310, or, between the fifth gear 420 and the fourth gear 310, will not be greater than half of a gear tooth. The transmission device can realize independent and precise control over the down-tilt of two or more beam antennas, and is compact in structure, small in size, and low in production cost.

Specifically, the first rotation direction can be the clockwise direction and the direction opposite to the first rotation direction can be the counterclockwise direction.

Further, the transmission ratio of the first gear 120 and the transmission ratio of the second gear 30 can be adjusted according to the actual requirements. Therefore, the position for the third gear 140 to revolute is more precise, and the engagement error between the third gear 140 and the fourth gear 310, or, between the fifth gear 420 and the fourth gear 310, will not be greater than half of a gear tooth. Meanwhile, the position selection of the rotary box 410 is quickened or slowed down.

As shown in FIG. 1 to FIG. 3 and FIG. 7, in combination with the above technical features, specifically, in Embodiment 1, the first gear 120 is engaged with the third gear 140; the rotary component 400 further comprises a sixth gear 430 mounted in the rotary box 410, by which the fifth gear 420 is driven by the second gear 130 to rotate in a same direction. Therefore, the first gear 120 drives the third gear 140 to rotate in an opposite direction, the second gear 130 drives the fifth gear 420 by the sixth gear 430 to rotate in a same direction, and when the first gear 120 rotates in a clockwise direction, the third gear 140 rotates in a counterclockwise direction and the fifth gear 420 rotates in the clockwise direction. The synchronous rotation of the fifth gear 420 and the second gear 130 can be realized by the sixth gear 430, or the rotation of the fifth gear 420 and the second gear 130 in a same direction can be realized by engagement with other transmission gear sets.

As shown in FIGS. 1, 5, 6 and 7, in combination with the above technical features, specifically, in Embodiment 2, the input component 100 further comprises a seventh gear 150 mounted in the rotary box 410 and engaged with both the first gear 120 and the third gear 140, by which the third gear 140 is driven by the first gear 120 to rotate in a same direction; and the rotary component 400 further comprises a transmission gear set 440 mounted in the rotary box 410, by which the fifth gear 420 is driven by the second gear 130 to rotate in an opposite direction. Therefore, the rotation of the first gear 120 and the third gear 140 in a same direction is realized by the seventh gear 150, and the rotation of the second gear 130 and the fifth gear 420 in an opposite direction is realized by the transmission gear set 440. The synchronous rotation of the fifth gear 420 and the second gear 130 in an opposite direction can be realized by the transmission gear set 440. The transmission gear set enables the fifth gear and the second gear to rotate in an opposite direction by the engaged transmission of two gears or the engaged transmission of four gears. In this embodiment, preferably, there are two gears in the transmission gear set 440.

As shown in FIGS. 1-8, in this embodiment, the unidirectional control mechanism further comprises a second unidirectional component 220 arranged in opposite to the first unidirectional component 210, the second unidirectional component 220 comprising a second rotating member 222 that can only unidirectionally rotate in the first rotation direction, the second rotating member 222 being fixedly connected to the rotary box 410. Therefore, when the first gear 120 drives the third gear 140 to rotate in a direction opposite to the first rotation direction, the inner gear ring 110 is unable to rotate in the direction opposite to the first rotation direction since the inner gear ring 110 is fixedly connected to the first rotating member 212 (the first rotating member 212 is unable to rotate in the direction opposite to the first rotation direction), and because the second rotating member 222 can rotate only in the first rotation direction, the third gear 140 can revolve only towards the first rotation direction and also drives the rotary box 410 to rotate along the first rotation direction, thus, according to the position of an antenna whose down-tilt is to be adjusted, the third gear 140 or the fifth gear 420 revolves to this position and comes into engagement with a corresponding fourth gear 310; then, the rotation direction of the input shaft 10 is reversed, when the first gear 120 drives the third gear 140 to rotate in the first rotation direction, the inner gear ring 110 can rotate in the first rotation direction (the first rotating member 212 can rotate in the first rotation direction), but because the second rotating member 222 is unable to revolve in the direction opposite to the first rotation direction, the third gear 140 can rotate about itself only in the first rotation direction to avoid slippage, and accordingly, the adjustment to the antenna down-tilt is realized; and after the adjustment to the antenna down-tilt is completed, the supply of power is stopped to stop the rotation of the third gear 140 timely by the second unidirectional component 220. Therefore, by the second rotating member 222 of the second unidirectional component 220, it is able to ensure that the third gear 140 will not rotate about itself while revolving. Further, the first unidirectional component 210 further comprises a third rotating member 214 that is inserted into the first rotating member 212 and can unidirectionally rotate relative to the first rotating member 212, the third rotating member 214 being fixed in a first preset position; and the second unidirectional component 220 further comprises a fourth rotating member 224 that is inserted into the second rotating member 222 and can unidirectionally rotate relative to the second rotating member 222, the fourth rotating member 224 being fixed in a second preset position. The specific examples of the first unidirectional component 210 and the second unidirectional component 220 are, for example, unidirectional rotating mechanisms such as unidirectional clutches and unidirectional bearings. Preferably, the first unidirectional component 210 is a first unidirectional bearing, the first rotating member 212 is an inner ring of the first unidirectional bearing and the third rotating member 214 is an outer ring of the first unidirectional bearing, or the first rotating member 212 is an outer ring of the first unidirectional bearing and the third rotating member 214 is an inner ring of the first unidirectional bearing; and the second unidirectional component 220 is a second unidirectional bearing, the second rotating member 222 is an inner ring of the second unidirectional bearing and the fourth rotating member 224 is an outer ring of the second unidirectional bearing, or the second unidirectional component 220 is a second unidirectional bearing, the second rotating member 222 is an outer ring of the second unidirectional bearing and the fourth rotating member 224 is an inner ring of the second unidirectional bearing. Therefore, the revolution or rotation of the third gear 140 can be realized by a unidirectional bearing, and the unidirectional bearing has advantages of rapid response and higher adjustment precision. Whether the third gear 140 and the inner gear ring 110 are connected to the inner ring or outer ring of the unidirectional bearing may be determined according to actual requirements. When the outer ring is fixed, the inner ring is fixedly connected to the first rotating member 212; and when the inner ring is fixed, the outer ring is fixedly connected to the first rotating member 212. The specific implementation of the first unidirectional bearing or second unidirectional bearing in the preset position can be realized by the existing technologies and will not be repeated here.

As shown in FIGS. 1-8, in this embodiment, the inner gear ring 110 is provided with a first connector (not shown), and the first rotating member 212 is provided with a first engaging hole (not shown) in snap fit with the connector. Therefore, by the snap fit of the first connector with the first engaging hole, the inner gear ring 110 is fixedly connected to the first rotating member 212. Meanwhile, it is also convenient for assembly and disassembly. Further, on an outer side of the first connector, there are at least two first lugs (not shown) arranged at an interval in a circumferential direction, and first engaging grooves (not shown), into which the first lugs are clamped, are formed on an inner wall of the first engaging hole. Therefore, by the one-to-one fitting of at least two first lugs with at least two first engaging grooves respectively, the slippage, which may influence the transmission precision, between the inner gear ring 110 and the first rotating member 212 can be effectively avoided. Still further, the first connector is provided with a first fitting hole (not shown) which is in rotational fit with the first end of the input shaft 10. Therefore, it is convenient to mount the input shaft 10 by the first fitting hole.

As shown in FIGS. 1-8, in this embodiment, the rotary box 410 comprises a first box body 412 and a second box body 414 that forms a placement chamber together with the first box body 412, the first box body 412 is fixedly connected to the second rotating member 222, the second box body 414 comprises a first cavity 416 for accommodating the second gear 130 and the third gear 140 and a second cavity 418 for accommodating the fifth gear 420, and the first cavity 416 has a first gap 407 and the second cavity 418 has a second gap 408; and the second end 144 of the third gear is engaged with the inner side of the fourth gear 310 through the first gap 407, and the fifth gear 420 is engaged with the outer side of the fourth gear 310 through the second gap 408. Therefore, the arrangement of the first box body 412 and the second box body 414 is convenient both for the mounting of the first gear 120, the second gear 130, the third gear 140, the fifth gear 420 and the sixth gear 430, and the later maintenance. Meanwhile, by the arrangement of the first gap 407 and the second gap 408, the gears in the rotary box 410 can be better protected, and the lubrication is facilitated.

Furthermore, the first box body 412 is further provided with a second connector (not shown), and the second rotating member 222 is provided with a second engaging hole (not shown) in snap fit with the connector. Therefore, by the snap fit of the second connector with the second engaging hole, the first box body 412 is fixedly connected to the second rotating member 222. Meanwhile, it is also convenient for assembly and disassembly. Further, on an outer side of the second connector, there are at least two second lugs (not shown) arranged at an interval in a circumferential direction, and second engaging grooves (not shown), into which the second lugs are clamped, are formed on an inner wall of the second engaging hole. Therefore, by the one-to-one fitting of at least two second lugs with at least two second engaging grooves, the slippage, which may influence the transmission precision, between the first box body 412 and the second rotating member 222 can be effectively avoided. Still further, the second connector is further provided with a second fitting hole (not shown) which is in rotation fit with the second end of the input shaft 10. Therefore, it is convenient to mount the input shaft 10 by the second fitting hole.

As shown in FIGS. 1, 7, 8 and 9, the first box body 412 is provided with an annular member 401 protruding outwardly, on which multiple sensing portions are formed. The specific shape of the sensing portions may be designed according to the characteristics of the sensing elements. In this embodiment, the sensing portions comprise at least two first sensing gaps 402 arranged at an equal interval in a circumferential direction and a second sensing gap 403 arranged between every two adjacent first sensing gaps 402. Therefore, the position of the third gear 140 can be determined by the first sensing gaps 402 and the position of the third gear 140 can be corrected by the second sensing gaps 403.

As shown in FIGS. 1, 9, 10 and 11, in this embodiment, the transmission device further comprises a first mounting plate 500 on which the second preset position is formed, wherein sensing elements configured to sense the first sensing gaps 402 and/or the second sensing gaps 403 are arranged on the first mounting plate 500; and the fourth rotating member 224 is fixed in the second preset position on the first mounting plate 500. Therefore, by the arrangement of the sensing elements on the first mounting plate 500, when the rotary box 410 is turned, the position of the first sensing gaps 402 and the second sensing gaps 403 changes correspondingly. The sensing elements can sense the change in position and send a corresponding trigger signal to the control device. Thus, the initial position of the rotary box 410 can be corrected, or the initial position of the third gear 140 or the initial position of the fifth gear 420 can be identified. The sensing elements may be magnetic sensing elements, photoelectric sensing elements, displacement sensing elements, etc. Further, an annular groove 510 fitted with the annular member 401 is formed on the first mounting plate 500. The annular member 401 is rotated in the annular groove 510, and a sensing end of the sensing element is arranged in the annular groove 510. Thus, external interference can be avoided. Preferably, the sensing elements are photoelectric sensors.

As shown in FIGS. 1, 9, 10 and 11, in this embodiment, the output component 300 further comprises a holder 320, on which a mounting through hole 322 and at least two locking holes 324 arranged at an interval in a peripheral direction of the mounting through hole 322 are defined; the fourth gear 310 is arranged on the holder 320 in such a manner that it can return elastically, a mounting shaft 312 in sliding fit with the mounting through hole 322 and at least two locking lugs 314 respectively corresponding to the locking holes 324 are disposed at one end of the fourth gear 310, and a first fitting lug 4141 arranged near the first gap 407 and a second fitting lug 4142 arranged near the second gap 408 are further disposed on the second box body 414; the fourth gear 310 can rotate, when a tail end of the mounting shaft 312 is pressed against the first fitting lug 4141 or the second fitting lug 4142; and the locking lug 314 is locked in the locking hole 324, when the tail end of the mounting shaft 312 is displaced from the first fitting lug 4141 or the second fitting lug 4142. Therefore, when the third gear 140 revolves and the fourth gear 310 is displaced from the first fitting lug 4141 or the second fitting lug 4142, the fourth gear 310 is locked so the fourth gear 310 will not be driven to rotate even when the third gear 140 or the fifth gear 420 touches the fourth gear 310, and the fourth gear 310 stays in a preset position without interfering the rotation of the third gear 140 or the fifth gear 420. As the rotary box 410 rotates together with the third gear 140, the shaft of the fourth gear 310 can rotate, only when the first fitting lug 4141 or the second fitting lug 4142 on the rotary box 410 is pressed against the tail end of the mounting shaft 312 of the fourth gear 310 and the fourth gear 310 moves upward so that the locking lugs 314 are separated from the locking holes 324. By such an arrangement, external interference is avoided. The adjustment to the beam antenna down-tilt is more precise. Further, the mounting shaft 312 has a conical pressing end 302 and the locking lug 314 has a conical free end. Therefore, it is convenient for the fourth gear 310 to be locked, so that the fourth gear 310 will not rotate when the third gear 140 revolves. Specifically, there are several locking holes 324 arranged at an interval in a same circumferential direction, with a spacing less than or equal to 0.1 mm between two adjacent locking holes 324. Therefore, when the fourth gear 310 rotates to any position, the locking lug 314 can be clamped in a locking hole 324 so that the fourth gear 310 is locked.

As shown in FIGS. 1, 9, 10 and 11, in this embodiment, the transmission device further comprises a second mounting plate 600 on which the first preset position is formed, wherein the second mounting plate 600 is fixedly connected to the holder 320 by a connecting rod 20, at least two output shafts 610 arranged at an interval in a same circumference are disposed on the second mounting plate 600, the output shafts 610 are in transmission connection to the fourth gears 310 in a one-to-one correspondence and the fourth gears 310 can slide in an axial direction of the output shafts 610, and an elastic member 620 configured to press the fourth gear 310 is disposed on the output shaft 610; and the third rotating member 214 is fixed in the first preset position on the second mounting plate 600. By the second mounting plate 600, the output component 300 is mounted and fixed, the fourth gear 310 is arranged on the holder 320 in such a manner that it can return elastically, and the fourth gear 310 drives the output shaft 610 to output power for rotation, in order to realize the adjustment to the beam antenna down-tilt. Meanwhile, by the connecting rod 20, the second mounting body and the first mounting body are connected into a whole piece. This is convenient for assembling and debugging in advance so that the transmission device can be directly assembled on site. The on-site mounting efficiency is improved. It is to be noted that the transmission connection between the output shaft 620 and the fourth gear 310 may be specifically implemented in various ways, and can be implemented by the existing technologies. In this embodiment, the output shaft 620 is provided with a polygonal connector, and the fourth gear 310 is provided with a polygonal connecting hole fitted with the polygonal connector. By the fitting of the polygonal connector with the polygonal connecting hole, the transmission connection between the output shaft 620 and the fourth gear 310 is realized.

It is to be noted that, the connection between the inner gear ring 110 and the first rotating member 212, between the second rotating member 222 and the rotary box 410, between the third rotating member 214 and the first mounting plate 500, and between the fourth rotating member 224 and the second mounting plate 600 is not limited to the connection ways disclosed in the specific embodiments. Various connection ways are possible. Other specific implementations may be realized by the existing technologies and will not be repeated here.

The present invention further provides an antenna down-tilt control system, comprising the transmission device described above, further comprising a driving device having a rotary output end connected to the input shaft 10, and a controller electrically coupled to the driving device. The antenna down-tilt control system uses, according to the requirement of adjustment to the antenna down-tilt, the controller to control the forward and reverse rotation of the output end of the driving device, so that the first gear 120 can rotate forwardly or reversely in the first rotation direction. In this way, the remote and intelligent adjustment to the down-tilt of the multi-beam antenna is realized.

Various technical features of the embodiments described above can be arbitrarily combined. For simplicity, all possible combinations of various technical features of the embodiments described above are not described. However, all those technical features shall be included in the protection scope of the present invention if not conflict.

The embodiments described above merely represent certain implementations of the present invention. Although those embodiments are described in more specific details, it is not to be construed as any limitation to the scope of the present invention. It should be noted that, for a person of ordinary skill in the art, a number of variations and improvements may be made without departing from the concept of the present invention, and those variations and improvements should be regarded as falling into the protection scope of the present invention. Therefore, the protection scope of the present invention should be subject to the appended claims.

The invention claimed is:

1. A transmission device, comprising:
an input component, comprising an inner gear ring, a first gear and a second gear both coaxial with the inner gear ring, and a third gear in functional connection to the first gear, both of the first gear and the second gear being mounted on an input shaft, the first gear having a transmission ratio different from that of the second gear, the first gear driving the third gear to rotate, the third gear having a first end engaged with the inner gear ring and being capable of rotating or revolving, and the third gear having a second end arranged outside the inner gear ring;
a unidirectional control mechanism fixed at a preset position, the unidirectional control mechanism comprising a first unidirectional component arranged near the inner gear ring, the first unidirectional component comprising a first rotating member that can unidirectionally rotate in a first rotation direction, the first rotating member being fixedly connected to the inner gear ring;
an output component, comprising at least two fourth gears arranged at an interval in a circumferential direction, the second end of the third gear being arranged on an inner side of the fourth gear and the third gear being selectively engaged with any one of the fourth gears; and a rotary component, comprising a fifth gear that rotates in a direction opposite to rotation direction of the third gear and a rotary box for housing the first gear, the second gear and the third gear, the fifth gear being arranged on the rotary box in a rotatable manner, the fifth gear having a first end in functional connection to the second gear and being driven by the second gear to rotate, the fifth gear having a second end arranged on an outer side of the fourth gear and being selectively engaged with the fourth gear, and the third gear being mounted in the rotary box and capable of driving the rotary box to rotate.

2. The transmission device according to claim 1, characterized in that the first gear is engaged with the third gear; and the rotary component further comprises a sixth gear mounted in the rotary box, by which the fifth gear is driven by the second gear to rotate in a same direction.

3. The transmission device according to claim 1, characterized in that the input component further comprises a seventh gear engaged with both the first gear and the third gear, by which the third gear is driven by the first gear to rotate in a same direction; and the rotary component further comprises a transmission gear set mounted in the rotary box, by which the fifth gear is driven by the second gear to rotate in an opposite direction.

4. The transmission device according to claim 1, characterized in that the unidirectional control mechanism further comprises a second unidirectional component arranged in opposite to the first unidirectional component, the second unidirectional component comprising a second rotating member that can unidirectionally rotate in the first rotation direction, the second rotating member being fixedly connected to the rotary box.

5. The transmission device according to claim 4, characterized in that the first unidirectional component further comprises a third rotating member that is inserted into the first rotating member and can unidirectionally rotate relative to the first rotating member, the third rotating member being fixed in a first preset position; and the second unidirectional component further comprises a fourth rotating member that is inserted into the second rotating member and can unidirectionally rotate relative to the second rotating member, the fourth rotating member being fixed in a second preset position.

6. The transmission device according to claim 5, characterized in that the rotary box comprises a first box body and a second box body that forms a placement chamber together with the first box body, the first box body is fixedly connected to the second rotating member, the second box body comprises a first cavity for accommodating the second gear and the third gear and a second cavity for accommodating the fifth gear, and the first cavity has a first gap and the second cavity has a second gap; and the second end of the third gear is engaged with the inner side of the fourth gear through the first gap, and the fifth gear is engaged with the outer side of the fourth gear through the second gap.

7. The transmission device according to claim 6, characterized in that the first box body is provided with an annular member protruding outwardly, on which multiple sensing portions are formed.

8. The transmission device according to claim 7, characterized in that the sensing portions comprise at least two first sensing gaps arranged at an equal interval in the circumferential direction and second sensing gaps arranged between adjacent two of the first sensing gaps.

9. The transmission device according to claim 8, further comprising a first mounting plate on which the second preset position is formed, wherein sensing elements configured to sense the first sensing gaps and/or the second sensing gaps are arranged on the first mounting plate; and the fourth rotating member is fixed at the second preset position on the first mounting plate.

10. The transmission device according to claim 5, characterized in that the output component further comprises a holder, on which a mounting through hole and at least two locking holes arranged at an interval in a peripheral direction of the mounting through hole are formed; the fourth gear is arranged on the holder in such a manner that it can return elastically, a mounting shaft in sliding fit with the mounting through hole and at least two locking lugs respectively corresponding to the locking holes are disposed at one end of the fourth gear, and a first fitting lug arranged near the first gap and a second fitting lug arranged near the second gap are further disposed on the second box body;

the fourth gear can rotate, when a tail end of the mounting shaft is pressed against the first fitting lug or the second fitting lug; and the locking lug is locked in the locking hole, when the tail end of the mounting shaft is displaced from the first fitting lug or the second fitting lug.

11. The transmission device according to claim 10, further comprising a second mounting plate on which the first preset position is formed, wherein the second mounting plate is fixedly connected to the holder by a connecting rod, at least two output shafts arranged at an interval in a same circumference are disposed on the second mounting plate, the output shafts are in transmission connection to the fourth gears in a one-to-one correspondence and the fourth gears can slide in an axial direction of the output shafts, and an elastic member configured to press the fourth gear is disposed on the output shaft; and the third rotating member is fixed in the first preset position on the second mounting plate.

12. The transmission device according to claim 10, characterized in that the mounting shaft has a conical pressing end and the locking lug has a conical free end.

13. An antenna down-tilt control system, comprising the transmission device according to claim 1, further comprising a driving device having a rotary output end connected to the input shaft, and a controller electrically coupled to the driving device.

* * * * *